United States Patent [19]
Clemente et al.

[11] 3,815,002
[45] June 4, 1974

[54] BRAKING CIRCUIT FOR ALTERNATING CURRENT INDUCTION MOTOR

[75] Inventors: Stefano Clemente, Monroeville; Brian R. Pelly, Murrysville, both of Pa.

[73] Assignee: Westinghouse Electric Corporation, Pittsburgh, Pa.

[22] Filed: May 29, 1973

[21] Appl. No.: 364,450

[52] U.S. Cl. .................................. 318/209, 318/380
[51] Int. Cl. .............................................. H02p 3/20
[58] Field of Search ......................... 318/209–212, 318/228, 229, 368, 375, 376, 380

[56] References Cited
UNITED STATES PATENTS

| | | | |
|---|---|---|---|
| 2,118,219 | 5/1938 | Mellon | 318/228 X |
| 3,045,166 | 7/1962 | Robinson | 318/209 X |
| 3,593,089 | 7/1971 | Appelo | 318/376 X |
| 3,667,016 | 5/1972 | Dunfield et al. | 318/209 |

*Primary Examiner*—Gene Z. Rubinson
*Attorney, Agent, or Firm*—J. M. Arnold

[57] ABSTRACT

A braking circuit is provided for squirrel-cage induction motors supplied from a variable frequency inverter to obtain increased braking torque when the motor is used for dynamic or regenerative braking, as in traction drives. This is accomplished by connecting resistive means in series relation with the motor windings to cause a voltage rise across the windings when the motor is driven as a generator. Control means are also provided for removing the resistive means from the circuit during motoring operation, and for controlling the effective value of resistance during braking to control the braking torque.

13 Claims, 5 Drawing Figures

BRAKING CIRCUIT FOR ALTERNATING CURRENT INDUCTION MOTOR

BACKGROUND OF THE INVENTION

The present invention relates to variable speed operation of squirrel-cage induction motors supplied by a variable frequency inverter, and more particularly to means for increasing the braking torque available when such a motor is operated in a braking mode.

While the usefulness of the invention is not necessarily limited to any specific application, it is particularly useful for motors used for traction drives, that is, propulsion motors for rapid transit cars or other vehicles. Direct current series motors have usually been used for traction drives because of their desirable speed-torque characteristics and adaptability to dynamic braking, although the alternating current squirrel-cage induction motor is inherently of very rugged construction and would be highly suitable for the severe conditions of traction service in which the propulsion motors are subjected to severe vibration and mechanical shock conditions as well as being exposed to dirt and other airborne contamination. Alternating current induction motors have not heretofore been used, however, because they have been considered essentially constant speed motors which would be unsuitable for traction drives for that reason. The development of high power, variable frequency static inverters, however, has made it possible to consider the use of induction motors for traction drives in order to take advantage of their rugged construction, freedom from commutation problems and relative ease of control.

One problem in the use of induction motors for traction drives is that of obtaining adequate braking torque when operating in the braking mode. The torque developed in the machine is a function of the voltage applied to the primary windings. For motoring operation, the applied voltage from the inverter can be increased as the speed increases, up to the maximum voltage rating of the inverter, in order to maintain constant torque as the motor accelerates. For higher speeds, the voltage is held constant at the maximum rating of the inverter and the torque decreases as the speed increases. This is acceptable for motor operation, as less accelerating capability is required at the higher speeds and lower torques are satisfactory. For braking operation, however, when the machine is being driven as an induction generator, braking torque at least as high as the maximum motor torque is desired at high speeds. That is, the machine should be operated at constant torque even at the higher speeds, so as to make it possible to maintain essentially constant braking torque for a constant rate of deceleration over as wide a speed range as possible. As indicated above, however, this would require an applied voltage that may be several times the maximum applied voltage needed during motor operation, and if the inverter must supply this high voltage during braking, its maximum voltage and power ratings must be correspondingly increased and the inverter then becomes too large and its cost too high to be economically practical for traction use.

SUMMARY OF THE INVENTION

In accordance with the present invention, a circuit is provided for increasing the voltage across the motor windings during braking operation without requiring any increase in the voltage supplied by the inverter above that required for motor operation.

This is accomplished by providing resistive means in series relation with the motor windings during braking in a manner to cause a rise in voltage across the windings when the machine is being driven as an induction generator. Since the torque developed in the machine is a function of the voltage across the machine windings, this results in increased torque without requiring any increase in the voltage supplied by the inverter to the machine windings. The desired braking torque can thus be obtained without any increase in size or cost of the inverter above that required for motoring operation. Any suitable type of resistive means may be used such as resistors in series with the motor windings, preferably on the neutral side of the windings. Rectifier circuits may also be used feeding back into the direct current supply line to recover the braking power.

Means are also provided for removing the resistive means from the circuit during motoring operation so that the motor operation is that of a normal induction motor. Preferably, thyristors are used for this purpose connected and controlled to short out the resistive means during motor operation. If desired, the thyristors can also be controlled to vary the effective value of resistance during braking, in order to control the braking torque to obtain any desired braking characteristic or rate of deceleration.

BRIEF DESCRIPTION OF THE DRAWINGS

The invention will be more fully understood from the following detailed description, taken in connection with the accompanying drawings, in which.

DESCRIPTION OF THE PREFERRED EMBODIMENTS

Figure 1:
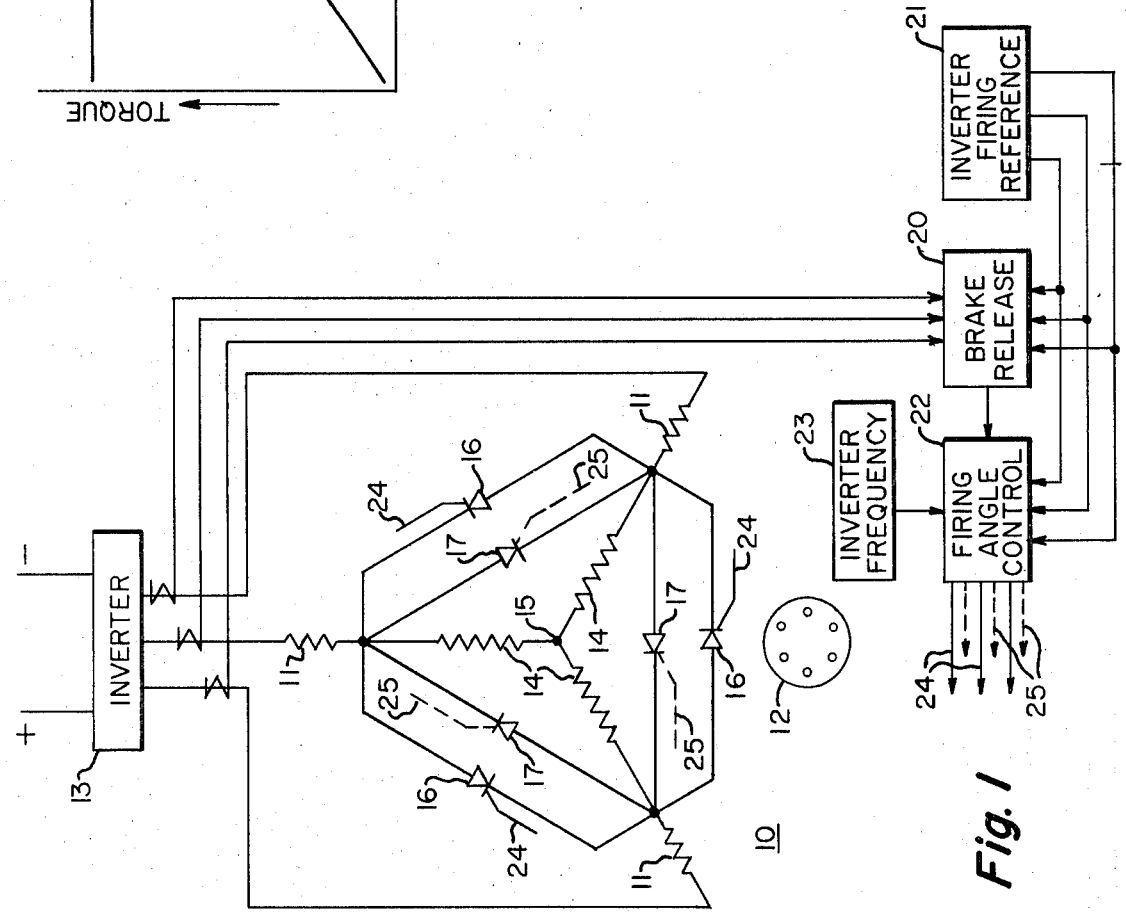
FIG. 1 is a schematic diagram showing a preferred embodiment of the invention.

A first embodiment of the invention is shown in FIG. 1 as applied to the control of an induction motor 10. The motor 10 may be a polyphase motor of any suitable or conventional construction and is shown as having three-phase primary or stator windings 11 and a squirrel-cage rotor 12. The motor 10 is intended to be operated at variable speed and for this purpose it is supplied by a variable frequency inverter 13 supplied from any suitable direct current or other source. For traction drive applications, the inverter would usually be supplied with direct current from a third rail or trolley, or other available direct current supply, although in general the inverter may be supplied from any desired source. The inverter 13 may be of any suitable type and has not been shown in detail since it is not a part of the invention. It may be controlled in any known or desired manner to supply a variable frequency, variable voltage output to the three-phase primary windings of the motor 10. The speed and torque of the motor can thus be controlled to obtain the desired motor characteristics.

For traction applications, and certain other variable speed motor applications, it is necessary that the motor be capable of operation in the braking mode, that is, that it be capable of being driven as a generator to develop braking torque for braking or decelerating the transit car or other load. The torque developed by the motor 10 is a function of the voltage applied across the primary windings 11 and, as previously discussed, in order to obtain the desired braking torque, this voltage must be higher at high speeds than the maximum voltage necessary for motor operation.

In accordance with the present invention, this increased voltage during braking operation is obtained without requiring the inverter 13 to supply a higher voltage than is required for motoring. In the embodiment of FIG. 1, this is accomplished by means of three resistors 14 connected in series with the three-phase primary motor windings 11 and connected together to the neutral point 15. Since the resistors 14 are required only during braking, they are removed from the circuit during motor operation and this is preferably accomplished by means of thyristors 16 connected across the resistors in the manner shown. It will be seen that if continuous firing signals are supplied to the thyristors 16 during motor operation, so that they are kept conductive, the resistors 14 are shorted out and the motor windings 11 are in the conventional three-phase Y-connection. For braking operation, the thyristors 16 are made non-conductive, either continuously or for desired portions of each half-cycle, and the resistors 14 are then connected in the circuit in series relation with the motor windings. A single thyristor 16 might be used for each phase, but in order to eliminate even harmonics and provide better control, a second thyristor 17 is preferably also connected across each phase in parallel with the thyristors 16 and with opposite polarity.

Figure 2:
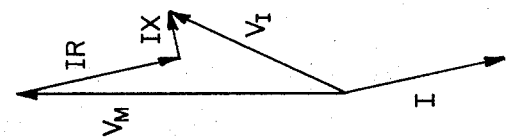
FIG. 2 is a vector diagram illustrating the operation of the circuit of FIG. 1.

The effect of this circuit arrangement is illustrated by the vector diagram of FIG. 2 which shows the voltage and current relations of a single phase during operation of the machine 10 as a generator, with the thyristors 16 and 17 non-conductive. When the machine is being driven by the car or other load as an induction generator, the motor current tends to lag the voltage by an angle approaching 180°. This current produces what may be considered a negative voltage drop, that is, a voltage rise, which adds vectorially to the applied voltage and thus increases the voltage across the motor windings. This is illustrated in FIG. 2 in which the current is represented by the vector I and the applied voltage, that is, the voltage supplied by the inverter, is represented by the vector $V_I$. The voltage drop in the resistor 14 is represented by the vector IR and the reactance drop due to the inductance of the winding 11 is represented by the vector IX. These drops add vectorially and combine with the applied voltage $V_I$ to give the resultant voltage $V_M$ across the machine windings. It will be seen that, as mentioned above, the current lags the voltage $V_M$ by almost 180°, and that the relationships are such that the voltage drops in the circuit combine with the applied voltage to result in a substantial rise in the voltage across the motor windings. In this way, an increased voltage is provided to increase the torque during braking without requiring the voltage supplied by the inverter to be increased above that needed for motor operation.

Figure 3:
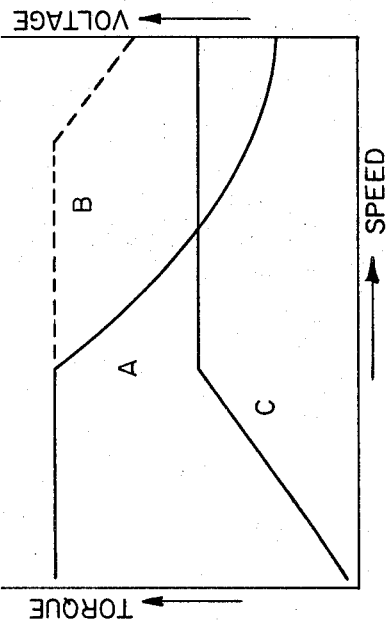
FIG. 3 is a set of curves illustrating the motor and braking operations obtainable by the present invention.

The effectiveness of this arrangement is further illustrated by the curves of FIG. 3 which are speed-torque curves for a typical embodiment of the invention. The curve A represents the speed-torque characteristic of the machine during motoring operation and the curve B represents the speed-torque characteristic during braking. The curve C represents the applied voltage, that is, the voltage supplied by the inverter to the machine. It will be seen that for motor operation, the applied voltage is increased linearly as the speed increases to maintain constant torque until the maximum available voltage is reached, after which the voltage is kept constant and the torque decreases, as shown by the curve A, so that the motor in this part of the speed range operates at approximately constant horsepower. For motor operation, this is entirely satisfactory since less accelerating ability is required at these higher speeds than in the lower part of the speed range. For braking, however, the braking torque should be kept constant over a great a range as possible, and should not be less than the maximum motor torque in order to obtain the necessary braking effort and rate of deceleration, and to provide the desired ability to control the braking rate or rate of deceleration and keep it constant over as wide a speed range as possible. The curve B of FIG. 3 shows the effectiveness of the present invention in this regard, and and it will be seen that the braking torque remains constant and the same as the maximum motor torque over almost all of the speed range and only falls off at very high speeds. This result is obtained without increasing the applied voltage above the maximum voltage required for motoring, as shown by the curve C. In the absence of any means for increasing the motor winding voltage, a speed-torque curve such as curve B could be obtained during braking only by continuing the linear increase in the applied voltage. Extrapolation of the rising part of curve C will show that this would require a voltage level more than twice the maximum voltage needed for motoring. Such an increase in the maximum voltage obtainable from the inverter 13 would result in a very large and expensive inverter which would not be economically practical for traction applications. The present invention, therefore, makes it possible to obtain the desired braking characteristic in a simple and relatively inexpensive manner without increasing the size or cost of the inverter above that required for motor operation.

The thyristors 16 and 17 may be controlled in any desired manner and the control circuitry for these thyristors has not been shown in detail since it is not part of the present invention. As shown diagrammatically in FIG. 1, however, the thyristors may be controlled by current signals derived from the inverter output and supplied to a brake release circuit 20 which is also supplied with signals from the inverter firing reference 21. The circuit 20 determines from these signals whether the machine 10 is operating in braking or motoring, and controls lthe firing angle control circuit 22 accordingly. The firing angle control receives signals from the inverter firing reference 21 and also a frequency signal 23 and provides firing signals on the conductors 24 for the thyristors 16 and on the conductors 25 for the thyristors 17. If the thyristors 17 are not used, the conductors 25 are, of course, omitted. The firing angle control 22 provides the necessary signals to fire the thyristors to keep them conductive during motor operation, and to make them non-conductive during braking. If desired, phase angle control may be included to fire the thyristors at the proper time in each half-cycle to control the effective resistance of the resistors in order to obtain the desired braking torque.

The control therefore operates to remove the resistive means from the circuit during motor operation so that the machine 10 runs as a normal induction motor with Y-connected primary windings. When braking is called for, the brake release circuit 20 senses this condition and controls the firing of the thyristors 16 and 17 accordingly. At the lower speeds, the voltage rise produced by the resistors 14 may not be needed, as can be seen from the curves B and C in FIG. 3, and when the speed is in this lower range the thyristors may be kept conductive to remove the resistors from the circuit. At the higher speeds or when higher braking torques are required, the thyristors are made non-conductive to insert the resistors in the circuit, and may be controlled as indicated above to vary the effective resistance to obtain the braking torque desired.

Figure 4:
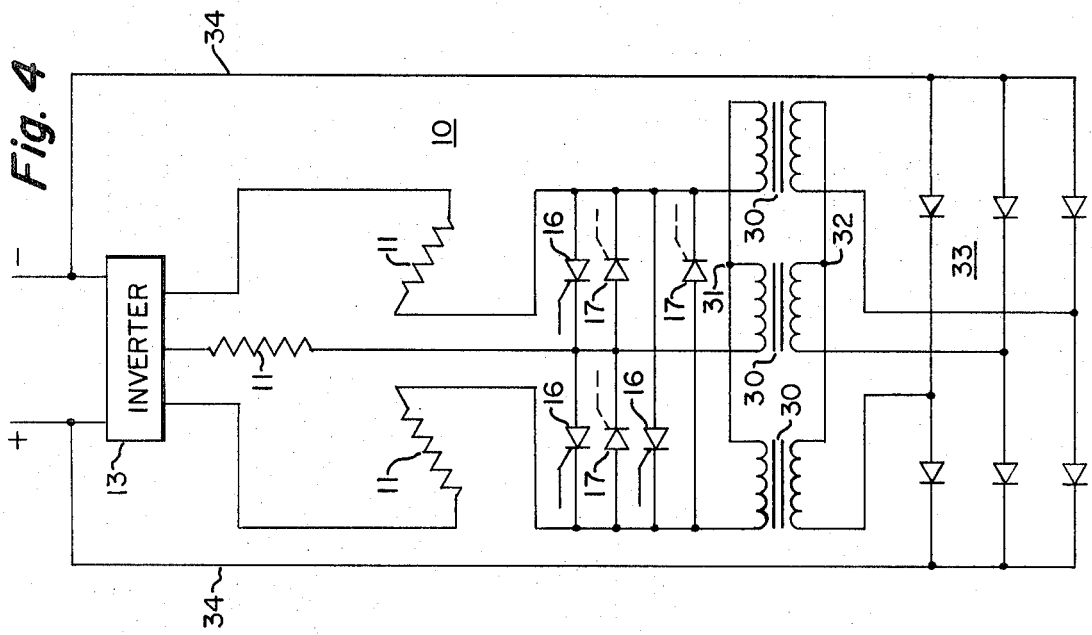
FIG. 4 is a schematic diagram showing another embodiment of the invention.

In the embodiment of the invention shown in FIG. 1 and described above, the motor 10 is operated in a partially regenerative and partially dynamic braking mode to provide braking torque; some power is regenerated back to the d-c source through the inverter, and the rest is dissipated as heat in the resistors 14. FIG. 4 shows another embodiment of the invention in which the braking power is totally regenerated and returned to the direct current supply. In this embodiment, the motor 10 and its primary windings 11 are the same as previously described, and are similarly supplied from the inverter 13 with variable frequency, variable voltage alternating current. In this embodiment of the invention, however, the three-phase windings 11 of the motor 10 are respectively connected to the primary windings of transformers 30 which are connected in Y at a neutral point 31. As before, pairs of oppositely connected thyristors 16 and 17 are connected across the transformer windings. The secondary windings of the transformers 30 are also connected in Y at a neutral point 32 and their output is connected to a three-phase rectifier bridge 33. The output of the rectifier bridge 33 is connected through conductors 34 to the direct current supply.

It will be seen that the combination of the transformers 30 and rectifier bridge 33 feeding back into the direct current supply constitutes a resistive load circuit connected in series relation to the motor windings, and has substantially the same effect as the resistors 14 of FIG. 1. Thus, a voltage rise is produced across the windings 11 in the same manner as in the previous embodiment so that the required braking torque is obtained in the same way. The embodiment of FIG. 4, however, has the advantage that substantially all of the braking power is regenerated back into the supply line and is recovered rather than being dissipated as in FIG. 1. The thyristors 16, and 17, if used, can be controlled in the same manner as described above to short out the transformers 30 during motoring so that the windings 11 are simply connected in Y for motor operation. The braking torque can be controlled by phase angle control of the thyristors, if desired, and the operation is essentially the same as that described above in connection with FIG. 1.

Figure 5:
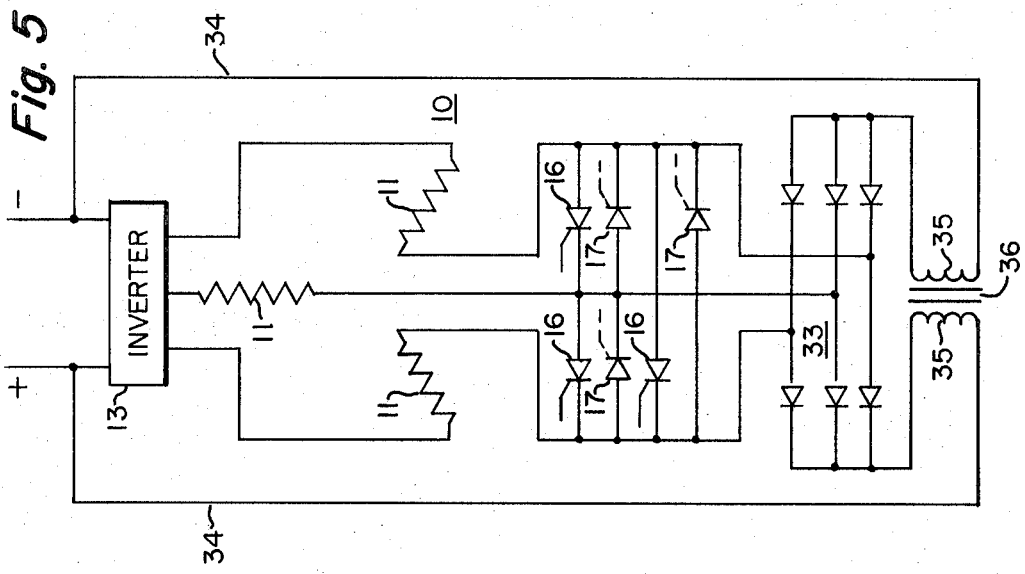
FIG. 5 is a schematic diagram showing a modified form of the embodiment of FIG. 4.

In the embodiment shown in FIG. 4, conventional two-winding transformers 30 are shown. It is, of course, possible to replace the transformers 30 with autotransformers to obtain the desired voltage relationships at somewhat lower cost. This circuit may be still further simplified in some cases by eliminating the transformers entirely. That is, if the transformer ratio can be made 1:1, then the transformer itself becomes unnecessary and can be eliminated, leading to the circuit shown in FIG. 5 in which the rectifier bridge 33 is connected directly to the motor windings 11. The thyristors 16 and 17 are connected and controlled as previously described. In this circuit configuration, an interphase reactor is required consisting of windings 35 in series with the direct current lines 34 and coupled together as by being wound on a common core 36. This is required to support ripple components of voltage that appear between the direct current output terminals of the rectifier bridge 33 and the direct current source. It will be seen, however, that in this case also the rectifier bridge 33 and supply circuit act effectively as a resistive load in series relation with the motor windings and thus a voltage rise is produced in the same manner as previously described.

It will now be apparent that an improved motor circuit has been disclosed for providing an increased braking torque during braking operation of a squirrel-cage induction motor, and this increased torque is obtained without requiring any increase in the voltage applied from the power source. The braking torque obtained in this manner can readily be controlled by control of the firing of the shorting thyristors which can be effected in any desired manner. A relatively simple and very effective means is provided for obtaining the desired braking torques and permitting regenerative braking operation, in certain of the described embodiments, to permit recovery of the braking power. It will be also understood that, although the invention has been described with reference to induction motors, the broad principles of the invention are also applicable to synchronous motors.

Certain specific embodiments of the invention have been shown and described for the purpose of illustration, but it will be understood that the invention is not limited to the particular arrangements shown but includes all equivalent modifications and embodiments.

What is claimed is:
1. A braking circuit comprising:
   an electric motor having polyphase primary windings;
   a source of variable frequency voltage applied to said windings for operation of said motor at variable speeds in either a motoring mode or a braking mode;
   a plurality of resistors, with a different one of said resistors being connected in series with each of said primary windings;
   a plurality of solid state switch means, with a different one of said switch means being connected across each of said resistors for short-circuiting said resistors during said motoring mode; and
   means for controlling the conduction of said switch means to control the effective resistance of said resistors during said braking mode.
2. The combination claimed in claim 1 wherein said source comprises an inverter.
3. The combination claimed in claim 2 wherein each of said switch means comprises a thyristor.
4. The combination claimed in claim 3 including:

a second thyristor connected across each of said resistors and poled in the opposite direction with respect to the thyristor comprising said first switch means.

5. A braking circuit comprising:
an electric motor having polyphase primary windings;
a source of variable frequency voltage applied to said windings for operation of said motor at variable speeds in either a motoring mode or a braking mode;
rectifier means connected to said windings, and including a direct current load circuit connected to said rectifier means; and
solid state switch means connected to short-circuit the rectifier means during said motoring mode.

6. The combination claimed in claim 5 wherein said source comprises an inverter.

7. The combination claimed in claim 6 wherein said switch means comprises a first plurality of thyristors.

8. The combination claimed in claim 7 including:
a second plurality thyristor connected across said first plurality of thyristors and poled in the opposite direction.

9. The combination defined in claim 5 and including means for controlling the conduction of said switch means to control the effective resistance of said rectifier means during braking operation.

10. A braking system comprising:
a direct current supply circuit;
an inverter supplied by said direct current circuit and adapted to provide a polyphase, variable frequency alternating current output;
an induction motor having polyphase primary windings connected to be energized by the output of said inverter for operation at variable speeds in either a motoring mode or a braking mode; and
a plurality of resistors with a different one of said resistors being connected in series between each primary winding and a neutral point, such that the voltage applied to the motor windings is increased above the inverter output voltage during the braking mode, and including means for removing said resistors from the motor circuit during the motoring mode.

11. The combination defined in claim 10 and including solid-state switching means connected across said resistors, and means for making said switching means conductive during motoring operation and for controlling the conduction of said switching means to control the effective resistance of said resistors during said braking mode.

12. A braking system comprising:
a direct current supply circuit;
an inverter supplied by said direct current circuit and adapted to provide a polyphase, variable frequency alternating current output;
an induction motor having polyphase primary windings connected to be energized by the output of said inverter for operation at variable speeds in either a motoring mode or a braking mode;
rectifier means connected in circuit relation with said windings such that the voltage applied to the motor windings is increased above the inverter output voltage during operation in the braking mode;
means for connecting the output of said rectifier means to said direct current supply circuit; and
solid state switch means connected across said rectifier means such that when said switch means is conductive said windings are connected together to a neutral point and said rectifier means is short-circuited, and including means for controlling said switch means such that said switch means is conductive during said motoring mode and the conduction of said switch means during the braking mode is controlled to vary the effective resistance of said rectifier means.

13. The combination defined in claim 12 in which said rectifier means is connected to said primary winding by transformer means.

* * * * *